United States Patent [19]

Yasui et al.

[11] Patent Number: 4,462,480
[45] Date of Patent: Jul. 31, 1984

[54] SNOWMOBILE REAR SUSPENSION UNIT

[75] Inventors: Toshihiro Yasui; Wayne L. Warnke, both of Coon Rapids, Minn.

[73] Assignee: Yamaha Hatsudoki Kabushiki Kaishi, Iwata, Japan

[21] Appl. No.: 336,416

[22] Filed: Dec. 31, 1981

[51] Int. Cl.³ .............................................. B62D 5/08
[52] U.S. Cl. .................................... 180/193; 180/9.1; 305/24
[58] Field of Search ............ 180/193, 192, 190, 9.2 R, 180/9.56; 305/24

[56] References Cited

U.S. PATENT DOCUMENTS

| | | | |
|---|---|---|---|
| 3,933,213 | 1/1976 | Trowbridge | 180/193 |
| 3,944,005 | 3/1976 | Tomita | 180/193 |
| 3,966,181 | 6/1976 | Lessard | 180/193 |

Primary Examiner—John A. Pekar
Attorney, Agent, or Firm—Ernest A. Beutler

[57] ABSTRACT

An improved suspension system for the drive track of a snowmobile that offers wide amounts of suspension travel and yet is compact enough to be positioned internally of the track. The suspension system permits the use of a tubular shock absorber and a surrounding coil spring for both the front and rear portions of the track. Both front and rear suspension systems embody a link arrangement for moving the ends of the shock absorber and spring toward each other upon upward travel of the track relative to the snowmobile body so as to achieve a wider range of damping for a given degree of suspension travel.

10 Claims, 5 Drawing Figures

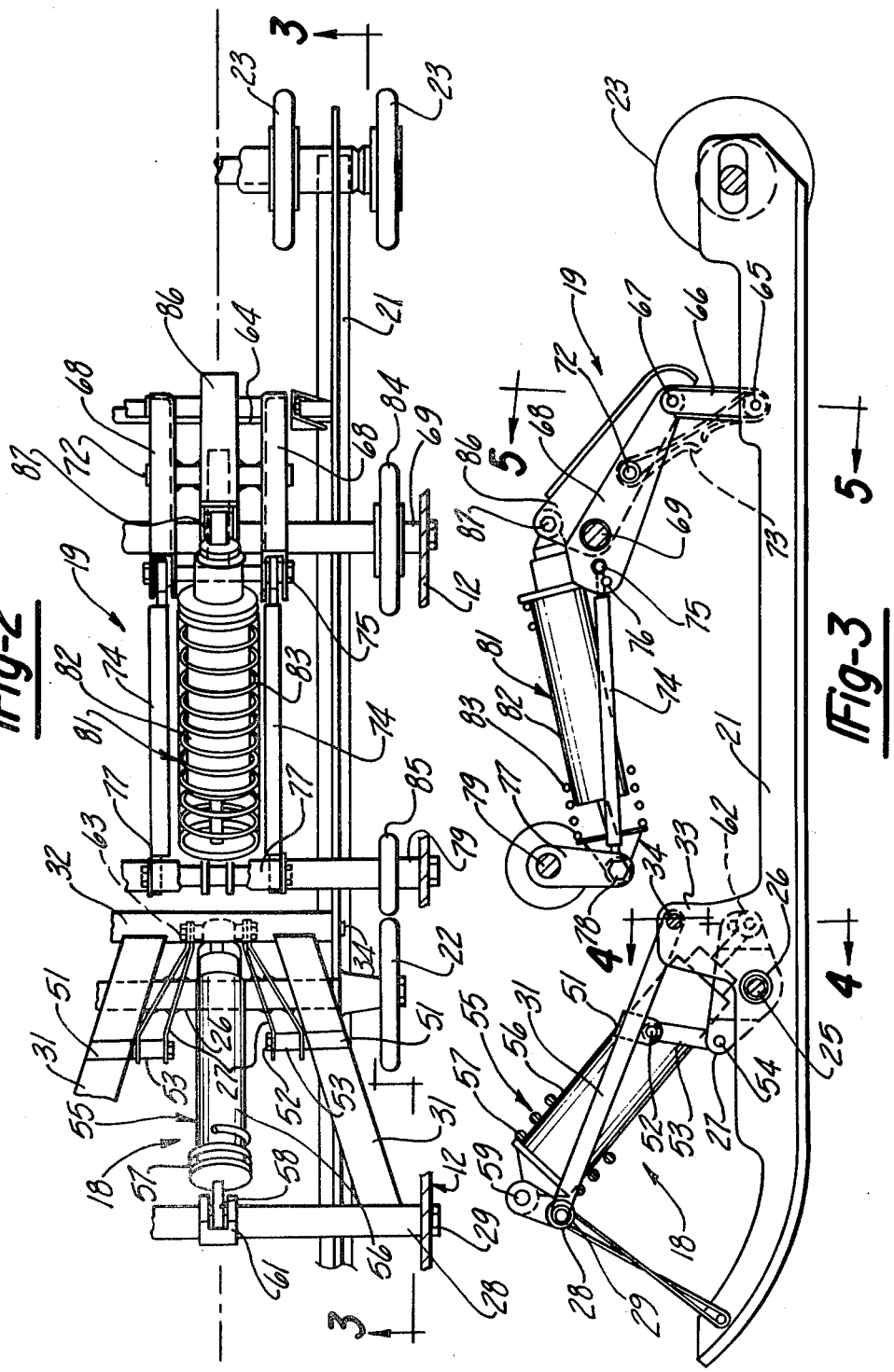

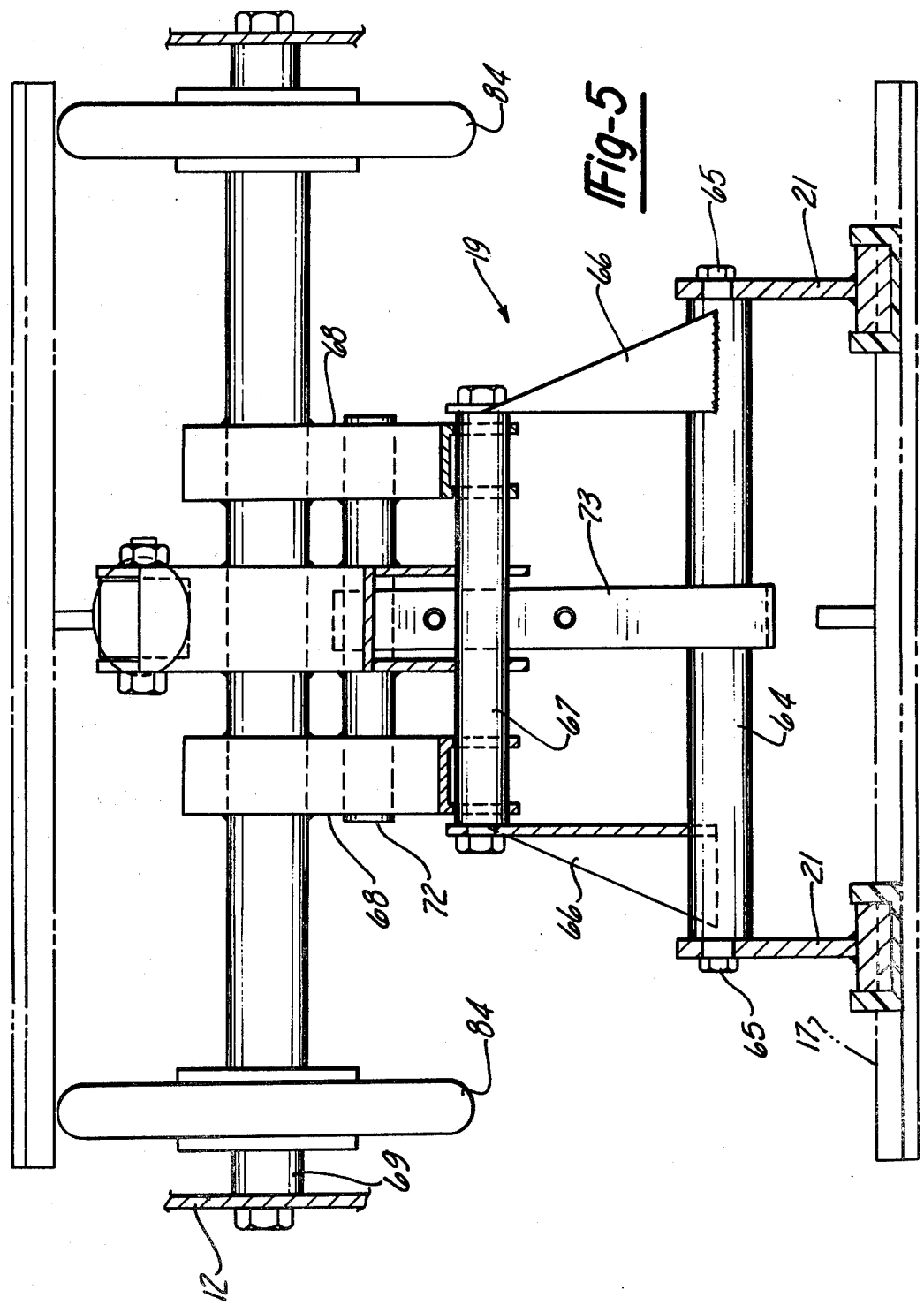

SNOWMOBILE REAR SUSPENSION UNIT

BACKGROUND OF THE INVENTION

This invention relates to a snowmobile suspension unit and more particularly to an improved suspension unit for the drive belt of a snowmobile.

As is well known, snowmobiles travel over a wide range of territories and it is not uncommon for them to encounter unexpected and abrupt changes in terrain. In order to permit good control and yet a relatively soft ride when travelling over relatively smooth surfaces, it is particularly desirable to provide a suspension system that affords a fairly large degree of suspension travel. However, due to the construction and general configuration of a snowmobile, this is not always possible. Because of the relatively large space taken up by the drive belt, it has been difficult to provide a suspension system that will afford such wide degrees of suspension travel with full control throughout the entire range of travel. Although it has been proposed to mount the suspension medium externally of the drive belt, such an arrangement not only unduly widens the body of the snowmobile but further places the suspension components in a location where they may be damaged. In addition, such outboard mounting of the suspension units requires the use of two units, one at each side of the snowmobile, so as to insure against uneven loadings; thus, increasing the cost of the assembly.

It has been proposed, therefore, to provide a suspension system that is positioned within the area circumscribed by the drive belt. When the suspension system is so located, however, it is extremely difficult to insure the desired degree of suspension travel without interference with the components. Furthermore, in order to permit such internal mounting of the suspension unit, it has been proposed to use torsional, mousetrap type of springs. This type of spring has several disadvantages in that is has a high degree of hysteresis and, furthermore, may severaly limit suspension travel.

The conventional type of snowmobile suspension frequently has the spring and/or shock absorber mounted at one end directly upon the vehicle body. As a result, all of the suspension loading is directly transmitted to the body and this requires a robust construction which adds to both weight and cost. Also, in order to establish a greater suspension travel, it is desirable to incoporate a progressive spring rate. However, with conventional snowmobile suspensions, it has been difficult, if not impossible, to incorporate an arrangement that provides a progressive spring rate without the use of high hysteresis springs.

It is, therefore, a principal object of this invention to provide an improved, compact suspension unit for a vehicle such as a snowmobile.

It is another object of the invention to provide a compact snowmobile suspension unit which may be positioned within the driving track and which yet affords a high degree of suspension travel with adequate control throughout the range of travel.

It is yet a further object of this invention to provide an improved suspension system for the rear portion of the driving track of a snowmobile or the like.

It is yet another object of this invention to provide a suspension system that reduces loading on the body.

It is yet a further object of the invention to provide a compact, lightweight suspension system that permits the use of low hysteresis spring and which still affords a possibility of having a progressive spring rate.

SUMMARY OF THE INVENTION

This invention is adapted to be embodied in a suspension system for a vehicle such as snowmobile or the like comprising a body and a ground engaging track or the like. The susepension system comprises a suspension element having a pair of relatively movable portions that are adapted to resiliently resist such relative movement. Means operatively interpose the suspension element between the track or the like and the body for moving each of the portion of the suspension element in opposite senses relative to the other upon movement of the track or the like relative to the body for amplifying the motion of the portions of the suspension element relative to each other upon movement of the track or the like relative to the body.

BRIEF DESCRIPTION OF THE DRAWINGS

FIG. 2 is a top plan view showing the details of the suspensicn system.

FIG. 3 is a side elevational view of the suspension system embodied in the snowmobile.

FIG. 5 is a cross-sectional view taken along the line 5—5 of FIG. 3.

DETAILED DESCRIPTION OF THE PREFERRED EMBODIMENT

Figure 1:
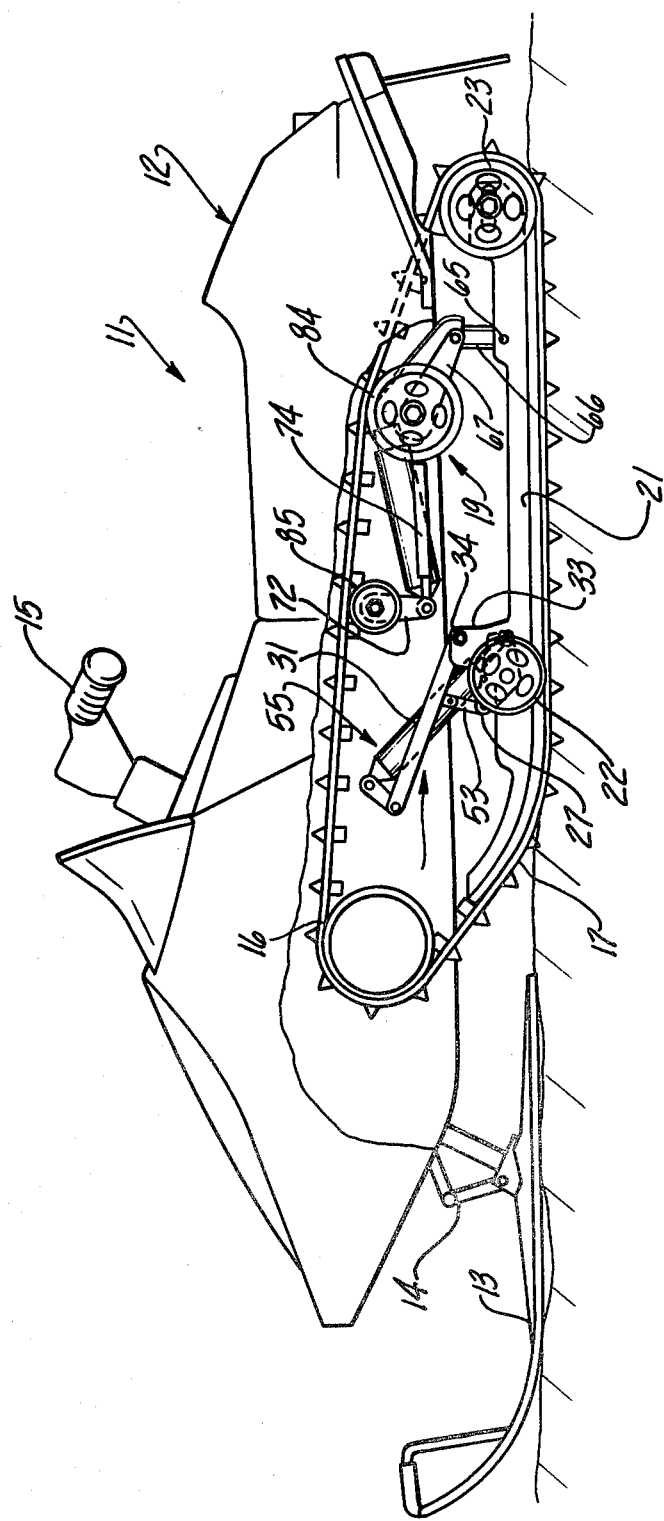
FIG. 1 is a side elevational view, with a portion broken away, of a snowmobile embodying a drive belt suspension system in accordance with this invention.

A snowmobile embodying a suspension system for the drive belt in accordance with this invention is identified generally by the reference numeral 11. The snowmobile 11 has a body assembly, indicated generally by the reference numeral 12. The body assembly 12 may be of any known construction and when it is referred to herein as a "body", it is to be understood that this term is intended to encompass a frame, if the body 12 incorporates such a frame, or the elements of the body itself.

A pair of front skis 13 are suspended by means of a suspension system 14, which may be of any known type, and are operatively coupled for steering movement to a handlebar assembly 15 in any known manner. The snowmobile 11 includes an engine which drives a continuously variable transmission having an output sprocket 16 which, in turn, drives a drive belt 17 in a known manner.

The drive belt 17 is suspended relative to the body 12 by means of a front suspension assembly, indicated generally by the reference number 18, and a rear suspension assembly, indicated generally by the reference numeral 19. The front and rear suspension assemblies 18 and 19 are connected to a pair of spaced guide rails 21 which, in turn, back up the drive belt 17 in a known manner. The guide rails 21 carry a first pair of spaced rollers 22 that are coupled to the front suspension assembly 18 and which engage the drive belt 17 in spaced relationship to the guide rails 21. In a like manner, a series of spaced guide rollers 23 are carried by the rear portion of the guide rails 21 and engage the rear portion of the drive belt 17.

Figure 4:
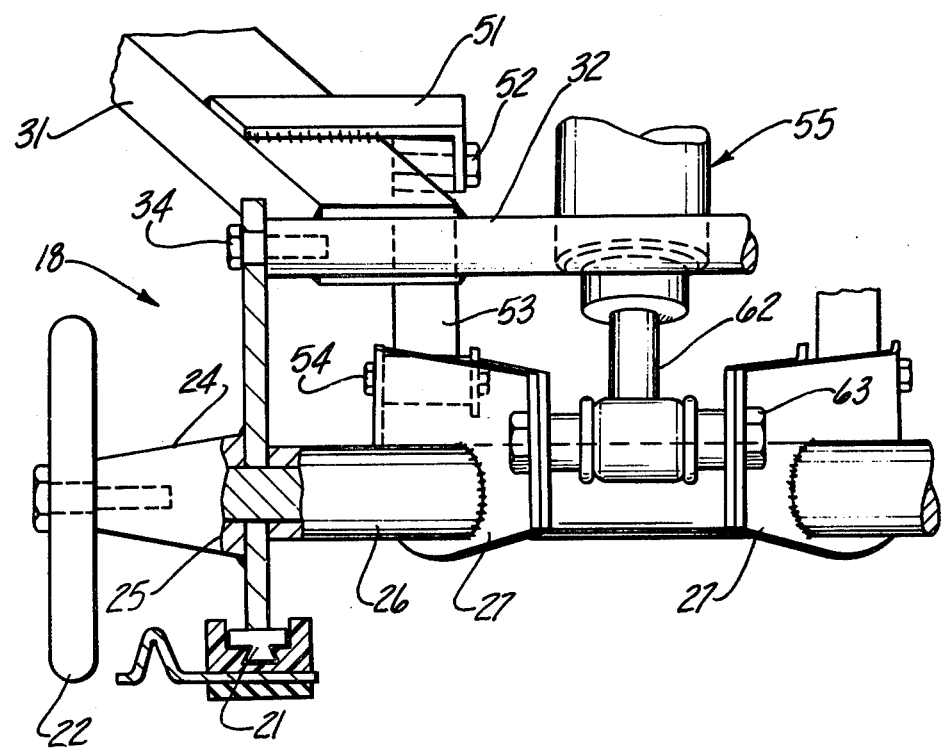
FIG. 4 is a cross-sectional view taken along the line 4—4 of FIG. 3.

Referring to the front suspension unit 18, which is shown is most detail in FIGS. 1 through 4, the guide rails 21 carry a pair of hubs 24 in which an axle 25 is journaled in any suitable manner. The rollers 22 are affixed to the outer ends of the axle 25, also in any suitable manner. Between the guide rails 21 a tube 26 is positioned which tube is rotatable supported upon the axle 25. The tube 26 is a portion of a weldment that comprises what may be considered to be a lever means assembly. This lever means assembly includes a pair of lever-like members 27 that are affixed to the tube 26 for pivotal movement with it and which, as will become apparent, act as bellcranks.

The front suspension 18 also includes a fabricated "A" suspension arm assembly consisting of a cross tube 28 that is pivotally supported in any suitable manner on the body 12, by means which may include the bolts 29. A pair of depending lever portions 31 are each rigidly connected at their forward ends to the cross tube 28, as by welding. The rearward end of each of the lever portions 31 are also welded to a rearward cross tube 32 which, in turn, is pivotally connected an upstanding projection 33 of each of the guide rails 21 in a suitable manner, as by means of pivots 34.

Intermediate the pivots 29 and 34, each lever portion 31 is formed with an inwardly extending bracket 51 which has a connection by means of a pivot pin 52 to a link 53. The lower end of each link 53 is pivotally connected to the forwardmost portion of each lever part 27 by means of a pivot pin 54. Upon upward movement of the forwardmost portion of the drive belt 17 and specifically the axle 25 relative to the body 12, the links 31 and 53 will cause the levers 27 and associated tube 26 to pivot about the axle 25.

The pivotal movement of the levers 27 and tube 26 is employed to load a suspension element, indicated generally by the reference numeral 55. The suspension element 55 in the illustrated embodiment includes a tubular shock absorber 56 and a surrounding coil spring 57. The upper end of the spring shock absorber element 55 has a mounting portion 58 that is pivotally connected by means of a bolt and nut assembly 59 to a trunion 61 that is affixed to the tube 28.

The suspension element 55 and specifically the shock absorber 56 includes a piston rod 62 that is pivotally connected between the trailing arms of the levers 27 in a known manner as by a bolt and nut assembly 63. This connection also includes a known arrangement for loading the lower end of the coil spring 57.

It should be readily apparent that upon suspension movement of the guide rails 21 and drive belt 17, the levers 27 will pivot about this axle so as to load the spring 57 and cause the elements of the shock absorber 56 to move relative to each other for resiliently supporting and damping the front motion of the drive belt 17. By appropriately locating the pivot points of the linkage employed to load the suspension element 55, either a linear rate or a progressive rate may be accomplished. The compact assembly permits the suspension unit to be located within the drive belt 17 and still have a smooth ride with low hysteresis.

Considering now the rear suspension 19 (FIGS. 1–3 and 5), a tube 64 spans the upstanding legs of the guide rails 21 and is journaled thereon by means including bolts 65. A welded lever assembly consisting of a pair of arms 66 is affixed to the tube 64 and extends generally upwardly therefrom. The arms 66 are pivotally connected at their outer ends by means of a tube 67 to a pair of fabricated bellcranks 68. The bellcranks 68 are, in turn, pivotally supported on an axle 69 which is journaled in the snowmobile frame or body 12. A shaft 72 also extends between and is affixed to the bellcrank 68 so as to tie them together. A strap 73 encircles the shaft 72 and the tube 64 so as to limit the maximum travel of the guide rails 21 relative to the snowmobile body 12 when the body 12 is lifted clear of the ground.

The portion of the bellcranks 68 forward of the axle 69 are pivotally connected to respective of a pair of links 74 by means of pivot pins 75. The bellcranks 68 may be formed with one or more additional apertures 76 so as to permit adjustment of the point of connection of the links 74 to the bellcrank 66 to alter the ride characteristics as desired.

The forward ends of the links 74 are pivotally connected to levers 77 by means of bolts or the like 78. The levers 77 are, in turn, pivotally supported relative to the snowmobile body 12 by means of a shaft 79. The levers 77 are employed to load a suspension element indicated generally by the reference numeral 81. The suspension element 81 consists of a hydraulic shock absorber 82 and surrounding spring 83. This loading is accomplished through the bolt 78 which is connected to the suspension element 81 in a known manner.

Guide rollers are carried on the axle 69 for engagement with the drive belt 17. In a like manner guide rollers 85 are supported on the axle 79 for also engaging the drive belt 17.

Also affixed to the bellcranks 68 is a weldment 86 which forms a further portion of a bellcrank assembly employed to load both ends of the suspension element 81. For this purpose the weldment 86 is connected in a known manner to the opposite end of the suspension element 81 by means including a bolt 87.

When the rear portion of the drive belt 17 engages an obstruction, the guide rails 21 will be urged upward relative to the body of the snowmobile body 12. As a result, the links 66 will load the bellcranks 68 and cause them to pivot in a counterclockwise direction about the axle 69 as viewed in FIG. 3. This pivotal movement will cause the links 74 to be drawn rearwardly and pivot the levers 77 also in a counterclockwise direction about the axle 79. As a result of this movement, the spring 83 and rod of the shock absorber unit 82 will be urged to the right. At the same time, the weldment 86 will be pivoted with the bellcranks 68 and this motion is transmitted through the bolt 87 to cause a the righthand side of the spring 83 and the cylinder unit of the shock absorber 82 to be moved to the left. Thus, the amount of suspension travel is amplified at the suspension element 81 so as to provide in effect a greater rate of travel than would be possible if only one end of the suspension assembly 81 were moved when a load was encountered. Thus, this provides an arrangement whereby less linkage is employed, a compact assembly results and unsprung weight is reduced. The linkage arrangement employed also reduces the amount of suspension loading which must be borne by the body and, thus, permits a lighter weight construction to be employed. Furthermore, a relatively simple linkage system is employed to achieve these results and which permit, if desired, a progressive spring rate with the use of a low hysteresis type spring, such as the coil springs employed.

It is to be understood that both front and rear suspension units have been described for the same drive belt. However, it is possible to employ either of the suspension units without the other or with different types of suspension units. Various other changes and modifications may be made without departing from the spirit and scope of the invention, as defined by the appended claims.

We claim:

1. A suspension system for a vehicle such as a snowmobile or the like comprising a body and a ground engaging track or the like, said suspension system comprising a suspension element having a pair of relatively movable portions adapted to resiliently resist such relative movement, and means for operatively interposing such suspension element between said track or the like and said body for moving each of said portions of said suspension element in opposite senses relative to the other upon movement of said track of the element relative to the body comprising a bellcrank having an intermediate pivot support and having opposite arms each operatively connected to a respective of the suspension element portions for movement of said portions each in a direction to load said suspension element upon pivot movement of said bellcrank, and means for pivoting said bellcrank upon movement of said track or the like relative to said body.

2. A suspension system as set forth in claim 1 wherein the bellcrank is pivotally supported by the body.

3. A suspension system for a vehicle such as a snowmobile or the like comprising a body and a ground engaging track or the like, said suspension system comprising a suspension element having a pair of relatively movable portions adapted to resiliently resist such relative movement, and means for operatively interposing such suspension element between said track or the like and said body for moving each of said portions of said suspension element in opposite senses relative to the other upon movement of said track of the element relative to the body comprising a bellcrank having an intermediate portion pivotally supported by the body and having opposite arms, a link pivotally connected to one of said bellcrank arms, a lever pivotally supported relative to said body, said link having a pivotal connection to said lever, one portion of said suspension element being pivotally connected to said lever and means for operatively connecting the other of said bellcrank arms to the other of said suspension element portions.

4. A suspension system for a vehicle such as a snowmobile or the like comrising a body and a ground engaging track or the like, said suspension system comprising a suspension element having a pair of relatively movable portions adapted to resiliently resist such relative movement, and means for operatively interposing such suspension element between said track or the like and said body for moving each of said portions of said suspension element in opposite senses relative to the other upon movement of said track of the element relative to the body comprising a bellcrank having an intermediate pivot support upon said body and having opposite arms each operatively connected to a respective of the suspension element portions, and link means pivotally connected at one end thereof for movement with the track or the like an pivotally connected to the other end thereof to said bellcrank.

5. A suspension system as set forth in claim 4 wherein the means for connecting one of the bellcrank arms to one of the suspension element portions includes a link pivotally connected to one end of said bellcrank arm and having a pivotal connection to a lever pivotally supported relative to the body, said portion of said suspension element being pivotally connected to said lever.

6. A suspension system as set forth in claim 5 wherein the other portion of the suspension element is pivotally connected to the bell crank.

7. A suspension system as set forth in any of claims 1 2, or 6 through wherein the suspension element comprises a coil spring.

8. A suspension system as set forth in any of claims 1 2, or, 6 through wherein the suspension element comprises a shock absorber.

9. A suspension system as set forth in claim 8 wherein the suspension element further includes a coil spring surrounding the shock absorber.

10. A suspension system as set forth in claim 9 wherein the suspension system is confined internally with an endless ground engaging track.

* * * * *